United States Patent [19]

Ma

[11] Patent Number: 5,880,928
[45] Date of Patent: Mar. 9, 1999

[54] NOTEBOOK COMPUTER WITH AUDIO AND VIDEO EFFECTS

[76] Inventor: His-Kuang Ma, 4F, No. 48, Sec.2, Chung Cherng Road, Taipei, Taiwan

[21] Appl. No.: 874,144

[22] Filed: Jun. 13, 1997

[51] Int. Cl.⁶ .................................. G06F 1/16; H05K 7/16
[52] U.S. Cl. .......................... 361/683; 361/681; D14/106
[58] Field of Search ..................................... 361/680, 681, 361/682, 683, 686; D14/106; 364/708.1; 248/919–923; G06F 1/16

[56] References Cited

U.S. PATENT DOCUMENTS

| | | | |
|---|---|---|---|
| D. 363,471 | 10/1995 | Shima et al. ............................ | D14/106 |
| 5,708,561 | 1/1998 | Huilgol et al. ........................... | 361/681 |
| 5,708,853 | 1/1998 | Sanemitsu ................................ | 361/737 |

*Primary Examiner*—Lynn D. Feild
*Attorney, Agent, or Firm*—Bacon & Thomas

[57] ABSTRACT

A notebook computer with audio and video effects including a body and a display. The body contains a mainframe inside and input and relevant elements at an upper side. The display is connected to the body by a rotary shaft and to the mainframe via a circuit device. Two sound holes are respectively formed at both lateral sides of the display for connection with respective sound boxes via sound box connecting elements, which are connected to the mainframe via a circuit device. The display is further provided with a camera hole at an upper side thereof opposite to the rotary shaft. The camera hole is connected to a CCD camera by a camera connecting device. The sound box connecting elements enable the respective sound boxes to be retained in the sound holes or exposed on the outside. Similarly, the camera connecting device enables the CCD camera to be retained in the camera hole or exposed on the outside.

2 Claims, 2 Drawing Sheets

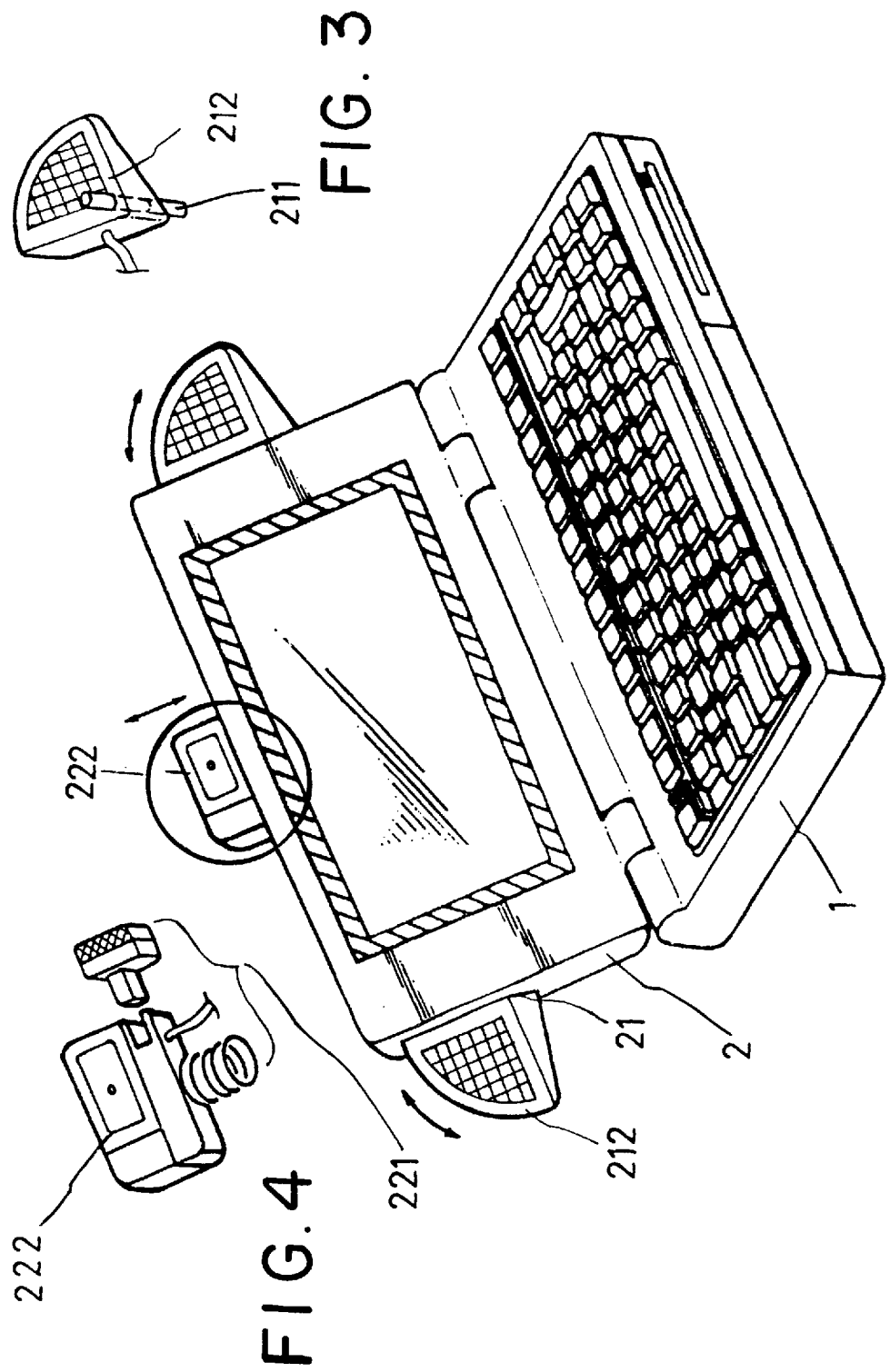

NOTEBOOK COMPUTER WITH AUDIO AND VIDEO EFFECTS

BACKGROUND OF THE INVENTION (a) Field of the Invention:

The present invention relates generally to a notebook computer, and more particularly to a notebook computer with audio and video effects.

(b) Description of the Prior Art:

The compact size and mobility of notebook computers have made them very popular today. To meet the demands of users, notebook computers are provided with multiple functions. Therefore, expansion devices for desk-tops are also found in notebook computers.

With personal computers, they may cooperate with telecommunication techniques to accomplish the so-called video conference. Through external connection to a CCD camera, video and audio information may be transmitted to the other party.

Although notebook computers have expanded in various peripheral functions, they have not been adapted for use for video conferences. A reason for that is the speakers of notebook computers are generally low in sound output.

SUMMARY OF THE INVENTION

Accordingly, a primary object of the present invention is to provide a notebook computer with audio and video effects.

BRIEF DESCRIPTION OF THE DRAWINGS

The foregoing and other features and advantages of the present invention will be more clearly understood from the following detailed description and the accompanying drawings, in which.

FIG. 2 is a schematic view illustrating operation of the notebook computer of the present invention;

FIG. 3 is a schematic view of a preferred embodiment of a sound box connecting device of the present invention; and FIG. 4 is a schematic view of a preferred embodiment of a camera connecting device of the present invention.

DETAILED DESCRIPTION OF THE PREFERRED EMBODIMENTS

Figure 1:
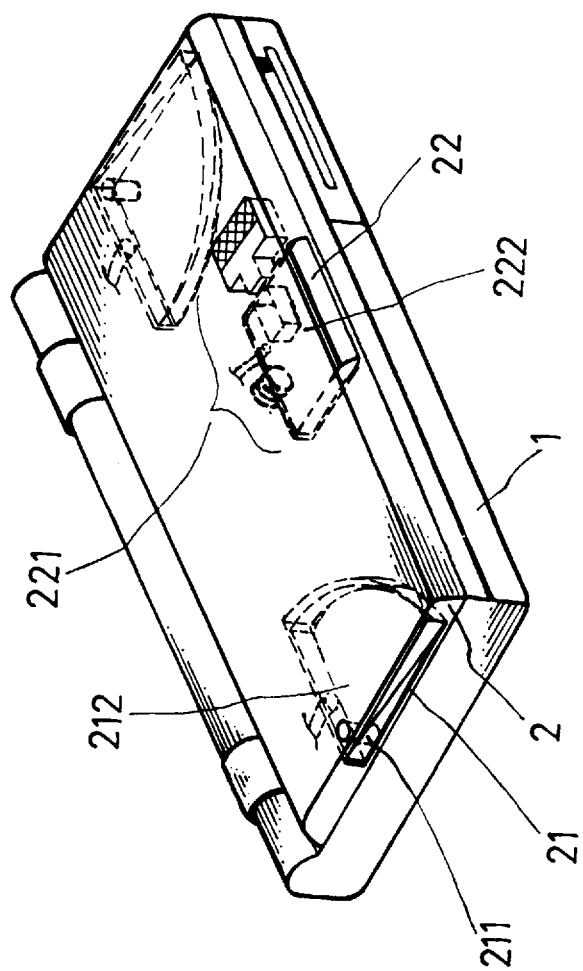
FIG. 1 is a schematic elevational view of the notebook computer of the present invention in a closed state.

With reference to the drawings, the notebook computer according to the present invention essentially comprises a body 1 and a display 2.

The body 1 is a conventional structure having a mainboard inside, and a keyboard and other conventional standard accessories at an upper side. The body 1 also has a conventional sound input device and is connected to the display 2 (to be described hereinafter) by hinges. As such has been well known in the art, it will not be discussed in detail herein.

The display 2 is also a conventional structure and connected to the body 1 by a rotary shaft and circuit means.

The present invention differs from the prior art in that a sound hole 21 is formed at either side of the display 2. Each sound hole 21 has a sound box connecting device 211 in the form of a pivot rod for connection with a sound box 212, and an amplifying speaker disposed inside. At the same time, at a top rim of an upper side after the display 2 is lifted, i.e., in the direction opposite to the rotary shaft, there is also provided a camera hole 22 which is connected via a camera connecting device 221 to a CCD camera 222. The above-mentioned sound box 212 and CCD camera 222 respectively have circuits passing through the rotary shaft to be connected to the mainframe.

In order that the sound boxes 212 may be accommodated in the respective sound holes 21, their sizes match one another. The same is with the camera hole 22 and the CCD camera 222. At the same time, in order to facilitate production and operation, referring to FIG. 3, the sound box 212 has a sector shape. The sound box connecting device 211 further includes a central hole for passage of a pivot rod, which is a conventional structure. The pivot in turn is fixed between an upper wall and a lower wall of the sound holes 21 near their outer sides. Therefore, the sound boxes 212 may be rotatably drawn out from the respective sound holes 211 or pushed back thereinto. Slide tracks and positioning means may also be provided at both sides of each sound hole 21, as in the prior art, to accommodate and position a sound box of a square or rectangular shape.

The CCD camera 22 is a conventional structure and has a box shape. As mentioned before, it has a size matching that of the camera hole 22. In order to facilitate production and operation, referring to FIG. 4, the camera connecting device 221 may be connected to a spring at a bottom side thereof. The spring is fixed at a bottom wall of the camera hole 22. The CCD camera 222 on the other hand is laterally provided with a retaining slot, and an engaging post is correspondingly disposed on the display 2. By pressing the engaging post, the CCD camera may be ejected or retracted. As with the sound holes, the camera hole 22 may be provided with slide tracks and positioning means at both sides thereof for receiving and positioning a square or rectangular CCD camera 222.

When not in use, the sound boxes 211 may be pushed into the respective sound holes 21, and the CCD camera may also be pushed into the camera hole 22, as shown in FIG. 1. After they have been pushed back and the display is closed in position, the notebook computer of the present invention appears no different from ordinary notebook computers.

In use, the sound boxes 212 and the CCD camera 222 are respectively drawn out from the respective sound holes 21 and camera hole 22, as shown in FIG. 2. If a video conference is to be held, then the CCD camera 222 may be used to take the image of the operator, and the image is processed and transmitted to the other party. And the output audio signals may achieve a larger volume and better quality through the sound boxes 21. In addition, the position of the display 2 correspond to the face and ears of the operator so that the taking of images by the CCD camera 222 and the transmission of sound may meet ergonomical requirements.

In view of the foregoing, the present invention provides a breakthrough in notebook computers. Though the construction is simple, it provides the notebook computer with multi-media and video functions, which cannot be found in the prior art.

Although the present invention has been illustrated and described with reference to the preferred embodiment thereof, it should be understood that it is in no way limited to the details of such embodiment but is capable of numerous modifications within the scope of the appended claims.

What is claimed is:

1. A notebook computer with audio and video effects, the computer comprising:

a) a body having a mainframe disposed internally of the body, the body including at least an input device at an upper side thereof;

b) a display, a rotary shaft connecting the display to the body for permitting the display to be lifted from or closed onto the body, the display including circuit means connected to the mainframe through the rotary shaft;

c) the display further including a pair of lateral edges, a sound hole formed at each lateral edge, a pair of sound boxes, a first connecting device connecting each sound box to a sound hole, a circuit means connecting each sound box to the mainframe, a camera hole formed at an upper rim of the display opposite to the rotary shaft, a CCD camera, a second connecting device connecting the camera hole to the camera, the second connecting device including a spring having two ends secured at a bottom side of the camera and a bottom wall of the camera hole, the camera being laterally provided with a retaining slot for receiving an engaging post correspondingly provided at a housing of the display for retaining the camera in the camera hole when the engaging post engages the retaining slot and ejecting the camera from the camera hole when the engaging post disengages from the engaging slot; and d) the first connecting device enabling the sound boxes to be retracted into the corresponding sound holes or exposed to the exterior thereof, and the record connecting device enabling the camera to be retracted into the camera hole or exposed to the exterior thereof.

2. The notebook computer of claim 1 wherein each sound box includes an end corner, the first connecting device includes a pivot rod extending through each end corner, each pivot rod having a pair of opposite ends which are secured between an upper wall and a lower wall of each sound hole for permitting the sound boxes to be rotatably pivoted into and out of the sound holes.

* * * * *